(12) United States Patent
Tasaka

(10) Patent No.: US 9,404,050 B2
(45) Date of Patent: Aug. 2, 2016

(54) STARTUP METHOD FOR FRACTIONATOR

(75) Inventor: Kazuhiko Tasaka, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 902 days.

(21) Appl. No.: 13/637,058

(22) PCT Filed: Mar. 15, 2011

(86) PCT No.: PCT/JP2011/055992
§ 371 (c)(1),
(2), (4) Date: Sep. 25, 2012

(87) PCT Pub. No.: WO2011/118442
PCT Pub. Date: Sep. 29, 2011

(65) Prior Publication Data
US 2013/0175010 A1 Jul. 11, 2013

(30) Foreign Application Priority Data

Mar. 25, 2010 (JP) .................................. 2010-070287
Mar. 30, 2010 (JP) .................................. 2010-076987

(51) Int. Cl.
*B01D 3/14* (2006.01)
*B01D 3/42* (2006.01)
(Continued)

(52) U.S. Cl.
CPC .. *C10G 7/12* (2013.01); *B01D 3/14* (2013.01); *B01D 3/42* (2013.01); *C10G 7/00* (2013.01);
(Continued)

(58) Field of Classification Search
CPC .............. B01D 3/14; B01D 3/42; C10G 7/00; C10G 7/12; C10G 47/00; C10G 65/14; C10G 2300/1022; C10G 2300/4031; C10G 2300/4081
USPC ............................................................ 203/21
See application file for complete search history.

(56) References Cited

U.S. PATENT DOCUMENTS 2,939,293 A  6/1960  Green
3,873,440 A *  3/1975  Hallman ....................... 208/108
(Continued)

FOREIGN PATENT DOCUMENTS

AU    2007-232925    10/2007
AU    2008-304853    4/2009
(Continued)

OTHER PUBLICATIONS

International Search Report dated Apr. 26, 2011 issued in corresponding PCT Application No. PCT/JP2011/055992.
(Continued)

*Primary Examiner* — Renee E Robinson
*Assistant Examiner* — Jonathan Miller
(74) *Attorney, Agent, or Firm* — Kenyon & Kenyon LLP

(57) ABSTRACT

A startup method for a fractionator that is supplied with, and fractionally distills, a hydrocracked product obtained in a wax fraction hydrocracking step by hydrocracking a wax fraction contained within a Fischer-Tropsch synthetic oil, the method including a preheating step of preheating the fractionator using a hydrocarbon oil that includes at least a portion of the hydrocracked product and is liquid at a normal temperature and normal pressure.

6 Claims, 2 Drawing Sheets

(51) Int. Cl.
*C10G 7/12* (2006.01)
*C10G 7/00* (2006.01)
*C10G 47/00* (2006.01)
*C10G 65/14* (2006.01)

(52) U.S. Cl.
CPC ............... *C10G 47/00* (2013.01); *C10G 65/14* (2013.01); *C10G 2300/1022* (2013.01); *C10G 2300/4031* (2013.01); *C10G 2300/4081* (2013.01)

(56) References Cited

U.S. PATENT DOCUMENTS

| | | | | |
|---|---|---|---|---|
| 4,127,392 | A * | 11/1978 | Watson et al. | 48/197 R |
| 6,958,364 | B1 * | 10/2005 | MacPherson et al. | 518/728 |
| 7,855,235 | B2 * | 12/2010 | Van Hardeveld | 518/705 |
| 7,855,236 | B2 * | 12/2010 | Van Hardeveld et al. | 518/706 |
| 7,985,777 | B2 * | 7/2011 | Stickney et al. | 518/705 |
| 8,685,212 | B2 * | 4/2014 | Tanaka et al. | 203/87 |
| 8,951,408 | B2 * | 2/2015 | Tanaka et al. | 208/142 |
| 2005/0027020 | A1 * | 2/2005 | Steynberg | 518/718 |
| 2008/0045737 | A1 | 2/2008 | Geisberger et al. | |
| 2008/0312347 | A1 | 12/2008 | Ernst et al. | |
| 2011/0049011 | A1 * | 3/2011 | Tanaka | 208/85 |

FOREIGN PATENT DOCUMENTS

| | | |
|---|---|---|
| AU | 2009-224387 | 9/2009 |
| JP | 60-220104 | 11/1985 |
| JP | 06-158059 | 6/1994 |
| JP | 2003-135902 | 5/2003 |
| JP | 2004-323626 | 11/2004 |
| JP | 2009-519371 | 5/2009 |
| JP | 2010-083999 | 4/2010 |
| WO | WO 2007/114276 | 10/2007 |
| WO | WO 2007/114277 | 10/2007 |
| WO | WO 2009/041545 | 4/2009 |
| WO | WO 2009/113574 | 9/2009 |
| WO | WO 2010/038389 | 4/2010 |

OTHER PUBLICATIONS

European Search Report dated Feb. 5, 2014 issued in corresponding EP Application No. EP 11759248.5.
Notification of Re-examination dated Apr. 13, 2016 issued in corresponding Chinese Application No. 201180015775.0 [with English Translation].
Henly et al., Separation Process Principles, East China University of Science and Technology Press, Nov. 2007, First Edition, p. 409 [with English Translation].

* cited by examiner

STARTUP METHOD FOR FRACTIONATOR

TECHNICAL FIELD

The present invention relates to a startup method for a fractionator that is supplied with, and fractionally distills, a hydrocracked product of a wax fraction contained within a synthetic oil produced by a Fischer-Tropsch synthesis reaction.

This application is a national stage application of International Application No. PCT/JP2011/055992, filed Mar. 15, 2011, which claims priority to Japanese Patent Application No. 2010-70287, filed Mar. 25, 2010, and Japanese Patent Application No. 2010-76987, filed Mar. 30, 2010, the contents of which are incorporated herein by reference.

BACKGROUND ART

In recent years, the desire to reduce environmental impact has resulted in growing demands for clean liquid fuels that contain minimal amounts of sulfur components and aromatic hydrocarbons and are gentle on the environment. As a result of these demands, processes that employ a Fischer-Tropsch synthesis reaction (hereinafter abbreviated as "FT synthesis reaction" in some cases), which uses carbon monoxide and hydrogen gas as feedstocks, have begun to be investigated as potential processes that are capable of producing fuel oil base stocks, and particularly kerosene and gas oil base stocks, that contain no sulfur components or aromatic hydrocarbons and are rich in aliphatic hydrocarbons, (for example, see Patent Document 1).

The synthetic oil (raw oil) obtained by the FT synthesis reaction (hereafter referred to as "FT synthetic oil" in some cases) is a mixture containing mainly aliphatic hydrocarbons having a broad carbon number distribution. From this FT synthetic oil can be obtained a naphtha fraction containing a large amount of components having a boiling point lower than approximately 150° C., a middle distillate containing a large amount of components having a boiling point within a range from approximately 150° C. to approximately 360° C., and a wax fraction containing a large amount of components that are heavier than the middle distillate (namely, components having a boiling point that exceeds approximately 360° C.). Of these fractions, the middle distillate is the most useful fraction, being equivalent to a kerosene and gas oil base stock, and it is desirable to achieve a high yield of this middle distillate. Accordingly, in an upgrading step in which the FT synthetic oil is hydroprocessed and fractionally distilled to obtain fuel oil base stocks, the wax fraction, which is produced in a reasonably large amount together with the middle distillate during the FT synthesis reaction step, is subjected to hydrocracking to reduce the molecular weight and convert the wax fraction to components equivalent to the middle distillate, thereby increasing the overall yield of the middle distillate.

Specifically, an example illustrated in FIG. 1 is given as a process for obtain the middle distillate by hydrocracking the wax fraction contained in the FT synthetic oil. That is, the crude wax fraction prior to hydrocracking, which is obtained from the FT synthetic oil by fractional distillation in a first fractionator 10, is supplied to a wax fraction hydrocracking device 50 via a line 14 and subjected to hydrocracking. The hydrocracked product is then supplied to a second fractionator 20 through a line 51. Meanwhile the crude middle distillate prior to hydrotreating, which is obtained from the FT synthetic oil by fractional distillation in the first fractionator 10, is supplied to a middle distillate hydrotreating device 40 via a line 13 and subjected to hydrotreating. The hydrotreated product then passes through a line 41, merges with the above-mentioned hydrocracked product, and is supplied to the second fractionator 20. The hydrocracked product and hydrotreated product supplied to the second fractionator 20 are fractionally distilled, and a middle distillate that becomes a kerosene and gas oil base stock is obtained from a line 22. Further, a bottom oil, composed mainly of a so-called "uncracked wax" that has not sufficiently undergone cracking during the wax fraction hydrocracking, is discharged from the bottom of the second fractionator 20, and this bottom oil is recycled through a line 24 to the line 14 that is upstream from the wax fraction hydrocracking device 50, and once again subjected to the hydrocracking.

The hydrocracked product discharged from the wax fraction hydrocracking device 50 includes not only hydrocarbon components having molecular weights that have fallen below a predetermined level as a result of the hydrocracking, but also the above-mentioned uncracked wax. This uncracked wax is a component having a high freezing point, and the hydrocracked product containing the uncracked wax is usually a solid or semisolid that exhibits no fluidity at a normal temperature and normal pressure.

Incidentally, when the second fractionator 20 is started up after a long period in a non-operational state, the second fractionator 20 and the lines and the like connected thereto are either at a normal temperature or a temperature close thereto.

If the above hydrocracked product of the wax fraction is supplied to the second fractionator 20 under these conditions, then the temperature of the hydrocracked product will fall, and there is a possibility that the hydrocracked product may become a solid or semisolid and block the second fractionator 20 or the lines and the like connected thereto. Accordingly, during startup of the fractionator 20, prior to supply of the hydrocracked product from the wax fraction hydrocracking device 50 to the fractionator 20, a hydrocarbon oil (hereinafter referred to as the "heating oil" in some cases) that is liquid at a normal temperature and normal pressure is introduced into the fractionator from an external source, and by heating and circulating this heating oil, the second fractionator 20 and the lines and the like connected thereto are preheated to a temperature that is sufficiently high to prevent the hydrocracked product from solidifying.

Following preheating of the second fractionator 20 in this manner, supply of the hydrocracked product from the wax fraction hydrocracking device 50 and the hydrotreated product from the middle distillate hydrotreating device 40 to the second fractionator 20 is started, and the second fractionator 20 begins operating. Employing this method enables prevention of the type of problem that occurs when those components contained within the hydrocracked product that have a high freezing point undergo cooling and solidification inside the second fractionator 20 or the lines and the like connected thereto, causing blockages within the device.

Following completion of the preheating of the second fractionator 20, the heating oil is transported to a slop tank via a discharge line 29 that branches from the line 24.

CITATION LIST

Patent Document

[Patent Document 1]
Japanese Unexamined Patent Application, First Publication No. 2004-323626

SUMMARY OF INVENTION

Technical Problem

However, in those cases when a fractionator to fractionally distill the hydrocracked product of the wax fraction such as the second fractionator 20 in the above-described example is preheated using the type of method described above, a dedicated heating oil needs to be prepared. This heating oil must be liquid at a normal temperature and normal pressure, and considering its incorporation within the product, must be a special hydrocarbon oil containing no sulfur components or aromatic hydrocarbons or the like. Further, a problem arises in that following completion of the preheating of the fractionator, the heating oil is not used within any of the products, and is frequently discarded or used as a fuel for internal use within the facility, which is inefficient.

The present invention has been developed in light of the above circumstances, and has an object of providing a startup method for a fractionator which enables the fractionator to be preheated without using a dedicated heating oil, and enables the used heating oil to be used as a product, rather than becoming a waste oil or a fuel for internal use within the facility.

Solution to Problem

A startup method for a fractionator according to the present invention is a startup method for a fractionator that is supplied with, and fractionally distills, a hydrocracked product obtained in a wax fraction hydrocracking step by hydrocracking a wax fraction contained within a Fischer-Tropsch synthetic oil, the method includes a preheating step of preheating the fractionator using a hydrocarbon oil that includes at least a portion of the hydrocracked product and is liquid at a normal temperature and normal pressure.

In the startup method for a fractionator according to the present invention, the hydrocracked product may be a product supplied from an operating wax fraction hydrocracking step.

In the startup method for a fractionator according to the present invention, the preheating step may include a step of heating the hydrocarbon oil and supplying the hydrocarbon oil to the fractionator, a step of discharging a bottom oil from the bottom of the fractionator and then heating the bottom oil and returning it to the fractionator, and a step of refluxing a fraction that is distilled from the top of the fractionator into the fractionator.

In the startup method for a fractionator according to the present invention, the hydrocracked product may be obtained by hydrocracking the wax fraction under conditions including a temperature of 300 to 400° C. and a LHSV rate of 0.1 to 1.2 $h^{-1}$ (per hour).

In the startup method for a fractionator according to the present invention, at least a portion of the hydrocracked product may be obtained by cooling and liquefying a gas component obtained by performing a gas-liquid separation of the hydrocracked product at a temperature of 180 to 300° C.

In the startup method for a fractionator according to the present invention, the hydrocarbon oil may be a mixture of at least a portion of the hydrocracked product and a hydrotreated product obtained by hydrotreating a middle distillate contained within the Fischer-Tropsch synthetic oil.

A startup method for a fractionator according to the present invention is a startup method for a fractionator that is supplied with, and fractionally distills, a hydrocracked product obtained by hydrocracking a wax fraction contained within a Fischer-Tropsch synthetic oil, the method includes a preheating step of preheating the fractionator using a hydrotreated product supplied from the middle distillate hydrotreating step hydrotreating a middle distillate contained within the synthetic oil.

In the startup method for a fractionator according to this aspect of the present invention, the preheating step may include a step of heating the hydrotreated product and supplying it to the fractionator, a step of discharging a bottom oil from the bottom of the fractionator and then heating the bottom oil and returning it to the fractionator, and a step of refluxing a fraction that is distilled from a top of the fractionator into the fractionator.

ADVANTAGEOUS EFFECTS OF INVENTION

According to the startup method of the present invention, a fractionator can be preheated without using a dedicated heating oil having special properties. Further, the hydrocarbon oil used in the preheating (either a hydrocarbon oil that contains at least a portion of the hydrocracked product of the wax fraction contained within the Fischer-Tropsch synthetic oil and is liquid at a normal temperature and normal pressure, or a hydrotreated product of the middle distillate contained within the synthetic oil) can be used as a product, rather than becoming a waste oil or a fuel for internal use within the facility, meaning the fractionator can be started up efficiently.

DESCRIPTION OF EMBODIMENTS

The present invention is described below in detail based on preferred embodiments.

[FT Synthetic Oil Upgrading System]

Figure 1:
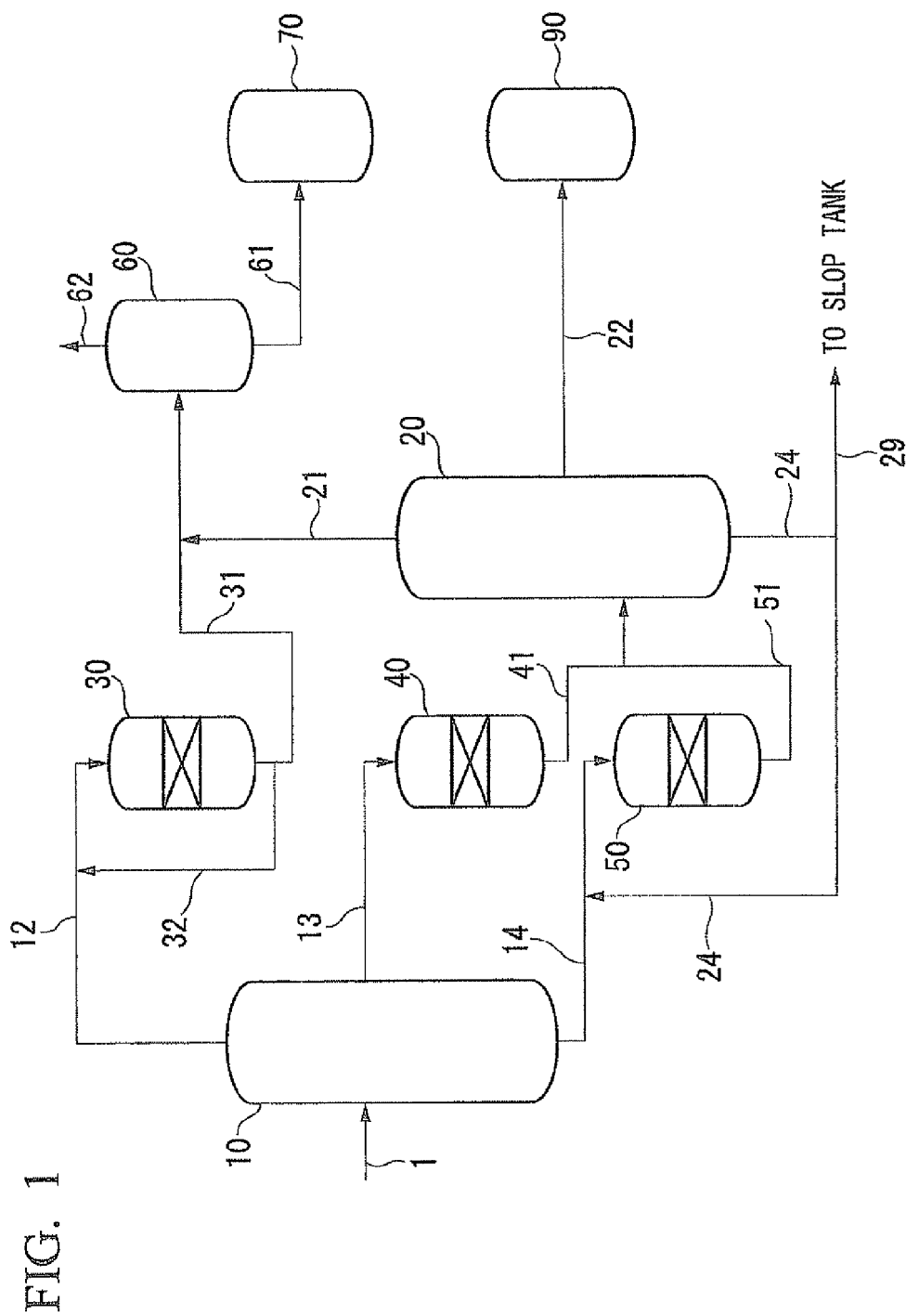
FIG. 1 is a schematic configuration diagram illustrating an example of FT synthetic oil upgrading systems.

FIG. 1 is a schematic configuration diagram illustrating an example of FT synthetic oil upgrading systems. First, the FT synthetic oil upgrading system is described with reference to FIG. 1.

The FT synthetic oil upgrading system illustrated in FIG. 1 includes a first fractionator 10 that fractionally distills a FT synthetic oil, which is introduced through a line 1 from an FT synthesis reactor not shown in the figure, into a crude naphtha fraction, a crude middle distillate and a crude wax fraction, a naphtha fraction hydrotreating device 30 that hydrotreats the crude naphtha fraction introduced through a line 12, a middle distillate hydrotreating device 40 that hydrotreats and hydroisomerizes the crude middle distillate introduced through a line 13, and a wax fraction hydrocracking device 50 that hydrocracks the crude wax fraction introduced through a line 14. The "crude naphtha fraction", "crude middle distillate" and "crude wax fraction" obtained from the first fractionator 10 refer respectively to each corresponding fractions that have not undergone hydrotreating or hydrocracking, and include, besides the saturated hydrocarbons, olefins and oxygen-containing compounds such as alcohols that represent the by-products of the FT synthesis reaction.

There are no particular limitations on the FT synthetic oil, provided it is an oil synthesized by the FT synthesis reaction, but in terms of maximizing the yield of the middle distillate, the synthetic oil preferably contains at least 80% by mass of hydrocarbons with a boiling point of approximately 150° C. or higher based on the total mass of the FT synthetic oil.

Furthermore, the FT synthetic oil is usually produced using a conventional FT synthesis reaction process, and is a mixture containing mainly aliphatic hydrocarbons with a broad carbon number distribution, but a fraction obtained by subjecting this synthetic oil to a preliminary fractional distillation may also be used.

The crude naphtha fraction is the component that distills in the first fractionator 10 at a temperature lower than approximately 150° C., the crude middle distillate is the component that distills in the first fractionator 10 at a temperature of not lower than approximately 150° C. and not higher than approximately 360° C., and the crude wax fraction is the component that does not distill in the first fractionator 10 even at a temperature of approximately 360° C., but is rather discharged from the bottom of the fractionator.

This description describes a preferred embodiment in which two cut points (namely, at approximately 150° C. and approximately 360° C.) are set in the first fractionator 10, thereby fractionally distilling the FT synthetic oil into three fractions, but for example, a single out point may also be set, in which case the fraction that distills at a temperature below the cut point is discharged as a middle distillate and supplied to the middle distillate hydrotreating device 40 via the line 13, and the fraction with a boiling point exceeding the cut point is discharged as a wax fraction and supplied to the wax fraction hydrocracking device 50 through the line 14.

Also, three cut points may also be set in the first fractionator 10, so that the FT synthetic oil is fractionally distilled into four fractions, namely a naphtha fraction, a middle distillate light component, a middle distillate heavy component, and a wax fraction.

Furthermore, a product of the FT synthesis reaction may be separated into a gas fraction and liquid fraction in a device for gas-liquid separation equipped within the FT synthesis reactor or downstream therefrom, and the obtained liquid fraction may be introduced into the wax fraction hydrocracking device 50 as a wax fraction, and a liquid component condensed by cooling the obtained gas fraction may be introduced into the middle distillate hydrotreating device 40 as a middle distillate, without providing the first fractionator.

In the naphtha fraction hydrotreating device 30, the crude naphtha fraction is hydrotreated by a conventional process, thereby converting olefins contained within the naphtha fraction into saturated hydrocarbons by hydrogenation, and converting oxygen-containing compounds such as alcohols into saturated hydrocarbons and water by hydrodeoxygenation.

In the middle distillate hydrotreating device 40, a conventional process is used to convert olefins and oxygen-containing compounds contained within the crude middle distillate into saturated hydrocarbons, in a similar manner to that described above for the naphtha fraction hydrotreating device 30. Further, at the same time, in order to improve the cold properties (low-temperature fluidity) of the product oil for use as a fuel oil base stock, at least a portion of the normal paraffins that constitute the main component of the crude middle distillate are hydroisomerized and converted to isoparaffins.

In the wax fraction hydrocracking device 50, a conventional process using a hydrocracking catalyst is used to hydrocrack the crude wax fraction, thereby converting the fraction to components equivalent to the middle distillate. During this process, the olefins and oxygen-containing compounds such as alcohols contained within the crude wax fraction are converted to paraffins. Furthermore, at the same time, the hydroisomerization of normal paraffins also proceeds, which contributes to an improvement in the cold properties (low-temperature fluidity) of the product oil for use as a fuel oil base stock.

On the other hand, a portion of the crude wax fraction undergoes excessive hydrocracking, and is converted to hydrocarbons equivalent to the naphtha fraction, which have an even lower boiling point than hydrocarbons of the boiling point range corresponding with the targeted middle distillate. Furthermore, a portion of the wax fraction undergoes even more hydrocracking, and is converted to gaseous hydrocarbons with a carbon number of 4 or less, such as butanes, propane, ethane and methane.

The FT synthetic oil upgrading system illustrated in FIG. 1 includes, downstream from the naphtha fraction hydrotreating device 30, a naphtha stabilizer 60 that discharges, from a line 62 connected to the top of the naphtha stabilizer, the gaseous hydrocarbons composed mainly of hydrocarbons having a carbon number of 4 or less that are contained within the naphtha fraction that has passed through the naphtha fraction hydrotreating device 30, and a naphtha tank 70 that stores the naphtha fraction from which the gaseous hydrocarbons have been removed in the above manner. The naphtha fraction discharged from the naphtha fraction hydrotreating device 30 is introduced into the naphtha stabilizer 60 through a line 31, and the naphtha fraction from which the gaseous hydrocarbons have been removed by the naphtha stabilizer 60 is supplied to, and stored in the naphtha tank 70 via a line 61.

Furthermore, a portion of the naphtha fraction that has been hydrotreated in. the naphtha fraction hydrotreating device 30 is recycled Through a line 32 to the line 12 upstream from the naphtha fraction hydrotreating device 30. The hydrotreating of the crude naphtha fraction is a highly exothermic reaction, and if only the crude naphtha fraction is subjected to the hydrotreating, then there is possibility that the temperature of the naphtha fraction in the naphtha fraction hydrotreating device 30 may increase excessively. Accordingly, by recycling a portion of the hydrotreated naphtha fraction, the crude naphtha fraction is diluted, thereby preventing any excessive temperature increase.

A second fractionator 20 is positioned downstream from the middle distillate hydrotreating device 40 and the wax fraction hydrocracking device 50, and this second fractionator 20 is supplied with the hydrotreated product from the middle distillate hydrotreating device 40 and the hydrocracked product from the wax fraction hydrocracking device 50, and fractionally distills this mixture of products. In the second fractionator 20, a light fraction is discharged through a line 21, and a middle distillate that becomes a kerosene and gas oil base stock is discharged from a line 22. The hydrotreated product from the middle distillate hydrotreating device 40 is supplied to the second fractionator 20 through a line 41, and the hydrocracked product from the wax fraction hydrocracking device 50 is supplied to the second fractionator 20 through a line 51. The hydrotreated product from the middle distillate hydrotreating device 40 and the hydrocracked product from the wax fraction hydrocracking device 50 that are supplied to the second fractionator 20 may be mixed by either in-line blending or tank blending, and there are no particular limitations on the mixing method employed.

Further, this embodiment illustrates an example in which the middle distillate from the second fractionator 20 is obtained as a single fraction, and is then fed through the line 22 into a middle distillate tank 90 for storage, but this middle distillate may also be fractionally distilled into a plurality of fractions, for example a kerosene fraction and a gas oil fraction, and each of the respective fractions may be fed to a plurality of tanks for storage.

The bottom oil from the second fractionator 20 is composed mainly of the uncracked wax, namely, the wax fraction that has not undergone sufficient hydrocracking in the wax fraction hydrocracking step having a boiling point exceeding approximately 360° C. This bottom oil is recycled through a line 24 to a line 14 that is upstream from the wax fraction hydrocracking device 50, and is subsequently re-supplied to the wax fraction hydrocracking device 50 and subjected to hydrocracking once again. This enables the middle distillate yield to be increased.

On the other hand, the light fraction discharged from the top of the second fractionator 20 is fed through the line 21 to the line 31, and is then supplied to the naphtha stabilizer 60.

[Middle Distillate Hydrotreating Step]

Figure 2:
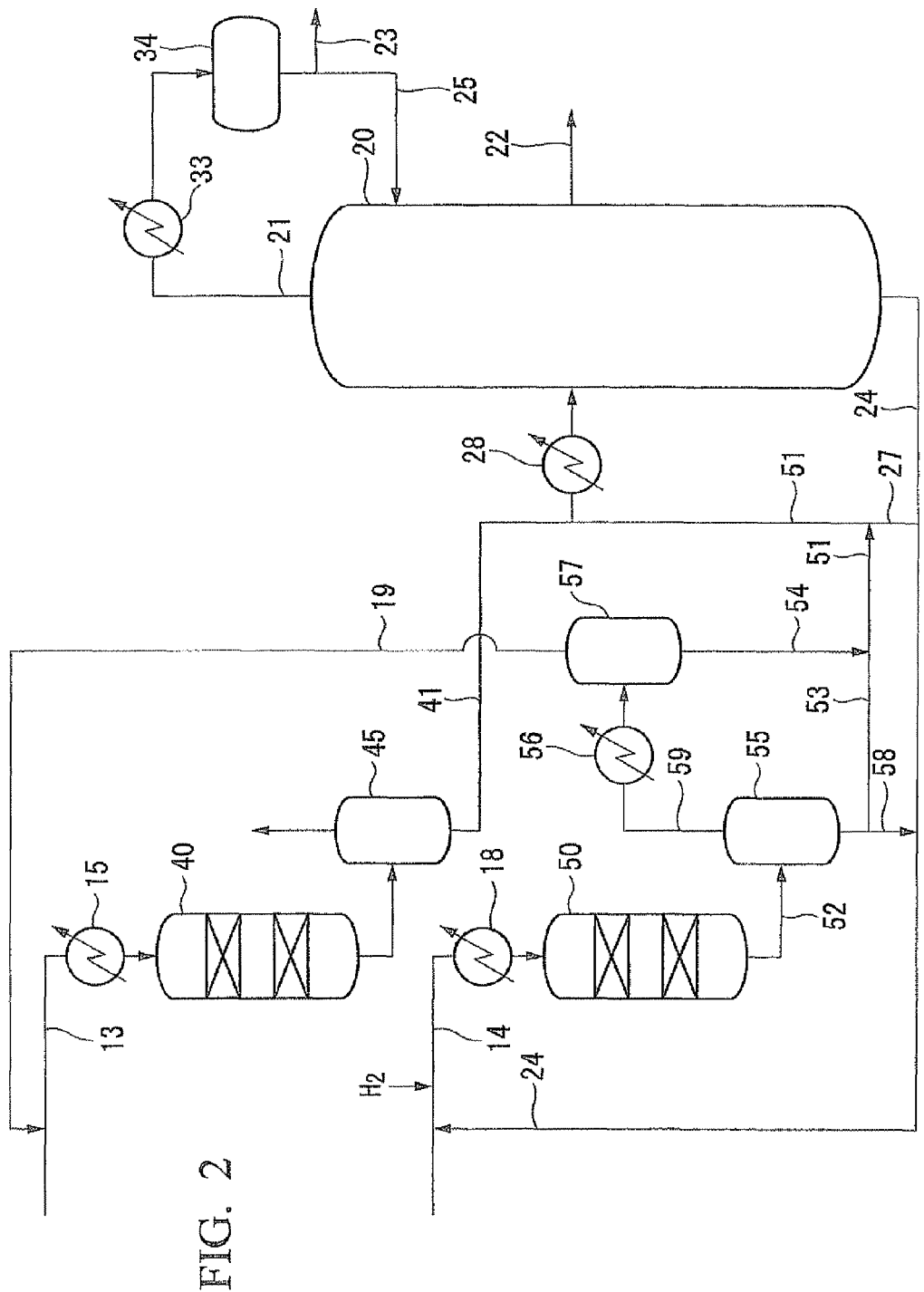
FIG. 2 is a configuration diagram providing a more specific illustration of a portion of FIG. 1.

Next is a detailed description of the configuration and operation of the middle distillate hydrotreating device 40 and equipment in the vicinity thereof, with reference to FIG. 2.

The middle distillate hydrotreating step is a step in which the crude middle distillate obtained from the FT synthesis reaction is hydrotreated and hydroisomerized in the middle distillate hydrotreating device 40. In the FT synthesis reaction, besides the saturated hydrocarbons that represents the main product, olefins and oxygen-containing compounds such as alcohols that contain an oxygen atom derived from carbon monoxide are also produced as by-products, and these by-products are also contained within the crude middle distillate obtained by fractional distillation of the FT synthetic oil. The hydrotreating performed in the middle distillate hydrotreating step includes mainly a reaction for converting the olefins to saturated hydrocarbons (paraffinic hydrocarbons) by hydrogenation, and a reaction for converting the oxygen-containing compounds into saturated hydrocarbons and water by hydrodeoxygenation. A catalyst in which a metal component having a hydrogenation capability acts as the active site can be used as an effective catalyst for this hydrotreating step.

On the other hand, the hydroisomerization in the middle distillate hydrotreating step is a reaction for converting the normal paraffins which represent the main components of the middle distillate into isoparaffins. A catalyst composed of a metal component having a hydrogenation-dehydrogenation capability and a solid acid component can be used as an effective catalyst for this hydroisomerization. The normal paraffins are first dehydrogenated under the action of the metal component to form olefins, these olefins undergo skeletal isomerization under the action of the solid acid component, and subsequent hydrogenation under the action of the metal component completes the conversion to isoparaffins.

In the middle distillate hydrotreating step, although a catalyst that is effective for the hydrotreating and a catalyst that is effective for the hydroisomerization may both be used, a catalyst that is effective for the hydroisomerization is generally also effective for the hydrotreating, and therefore the use of a catalyst that is effective for the hydroisomerization is more efficient, and consequently preferred.

As illustrated in FIG. 2, the crude middle distillate supplied from the first fractionator (not shown in the figure) through a line 13, and in some cases via an intermediate tank (not shown in the figure), is mixed with a gas including hydrogen gas supplied through a line 19, heated toward the reaction temperature by a heating means 15 such as a heat exchanger, supplied into the middle distillate hydrotreating device 40, and hydrotreated and hydroisomerized to obtain the hydrotreated product.

Although there are no particular limitations on the configuration of the middle distillate hydrotreating device 40 according to the present invention, a fixed-bed continuous-flow reactor is preferred. Either a single reactor may be used, or a plurality of reactors may be positioned in series or parallel. Further, the catalyst bed provided inside the reactor may be a single bed, or may be partitioned into a plurality of sections.

Examples of catalysts that are packed in the middle distillate hydrotreating device 40 include the types of catalysts typically used for hydrotreating and/or hydroisomerization in petroleum refining and the like, namely catalysts in which an active metal having a hydrogenation (-dehydrogenation) capability is supported on an inorganic carrier.

Examples of the active metal that constitutes the catalyst include one or more metals selected from the group consisting of metals belonging to group 6, group 8, group 9 and group 10 of the periodic table of elements. Specific examples of these metals include noble metals such as platinum, palladium, rhodium, ruthenium, iridium and osmium, as well as cobalt, nickel, molybdenum, tungsten and iron. Of these, platinum, palladium, nickel, cobalt, molybdenum and tungsten are preferred, and platinum and palladium are particularly preferred. Further, the use of a combination of a plurality of these metals is also preferable, and examples of preferred combinations include platinum-palladium, cobalt-molybdenum, nickel-molybdenum, nickel-cobalt-molybdenum and nickel-tungsten. In this description, "the periodic table of elements" refers to the long period type periodic table of elements prescribed by IUPAC (the International Union of Pure and Applied Chemistry).

Examples of the inorganic carrier that constitutes the catalyst include metal oxides such as alumina, silica, titania, zirconia and boria. Any one of these metal oxides may be used individually, or a mixture of two or more oxides or a composite metal oxide such as silica-alumina, silica-zirconia, alumina-zirconia, or alumina-boria may be used. From the viewpoint of enabling hydroisomerization of normal paraffins to proceed efficiently at the same time as the hydrotreating, the inorganic carrier is preferably a composite metal oxide having solid acidity such as silica-alumina, silica-zirconia, alumina-zirconia or alumina-boria. Further, the inorganic carrier may also contain a small amount of a zeolite.

Moreover, in order to improve the moldability and mechanical strength of the carrier, the inorganic carrier may also contain a binder. Examples of preferred binders include alumina, silica and magnesia.

In those cases where the active metal is an above-mentioned noble metal, the amount of the active metal within the catalyst, recorded as the mass of metal atoms relative to the mass of the carrier, is preferably within a range from approximately 0.1 to 3% by mass. Further, in those cases where the active metal is one of the above metals other than a noble metal, the amount of the active metal, recorded as the mass of metal oxide relative to the mass of the carrier, is preferably within a range from approximately 2 to 50% by mass. If the amount of the active metal is less than the above-mentioned lower limit, then the hydrotreating and hydroisomerization tend not to progress satisfactorily. In contrast, if the amount of the active metal exceeds the above-mentioned upper limit, then the dispersion of the active metal tends to deteriorate and the activity of the catalyst decreases. Moreover, the catalyst cost also increases.

The reaction temperature inside the middle distillate hydrotreating device 40 of this embodiment is typically within a range from 180 to 400° C., preferably from 280 to 350° C., and more preferably from 300 to 340° C. Here, the reaction temperature refers to the average temperature of the catalyst layer inside the middle distillate hydrotreating device 40. Provided the reaction temperature is at least as high as the lower limit of the above temperature range, the crude middle distillate undergoes satisfactory hydrotreating and hydroisomerization, and provided the temperature is not higher than the upper limit of the above temperature range, decomposition reactions of the middle distillate can be inhibited, and reduction in the life of the catalyst can be suppressed.

The pressure (hydrogen partial pressure) inside the middle distillate hydrotreating device 40 is preferably within a range from 0.5 to 12 MPa, and more preferably from 1 to 5 MPa. Provided the pressure inside the hydrotreating device is at least 0.5 MPa, the crude middle distillate undergoes satisfactory hydrotreating and hydroisomerization, and provided the pressure is not higher than 12 MPa, equipment costs associated with increasing the pressure resistance of the equipment can be kept to a minimum.

The liquid hourly space velocity (LHSV) inside the middle distillate hydrotreating device 40 is preferably within a range from 0.1 to 10 $h^{-1}$ (per hour), and more preferably from 0.3 to 3.5 $h^{-1}$. Provided the LHSV is at least 0.1 $h^{-1}$, the capacity of the reactor need not be excessively large, and provided the LHSV is not higher than 10 $h^{-1}$, the crude middle distillate can be hydrotreated and hydroisomerized efficiently.

The hydrogen gas/oil ratio in the middle distillate hydrotreating device 40 is preferably within a range from 50 to 1,000 NL/L, and is more preferably from 70 to 800 NL/L. In this description, the units "NL" represents the hydrogen gas volume (L) under standard conditions (0° C., 101,325 Pa). Provided the hydrogen gas/oil ratio is at least 50 NL/L, the crude middle distillate undergoes satisfactory hydrotreating and hydroisomerization, and provided the hydrogen gas/oil ratio is not higher than 1,000 NL/L, equipment for supplying a large volume of hydrogen gas is unnecessary, and any increases in the operational costs can be suppressed.

[Wax Fraction Hydrocracking Step~Recycling Step]

A configuration diagram that details the devices in the vicinity of the middle distillate hydrotreating device 40 and the wax fraction hydrocracking device 50 is illustrated in FIG. 2, and the wax fraction hydrocracking step and each of the subsequent downstream steps therefrom in the above-mentioned upgrading system are described below in detail, with reference to FIG. 2.

(Wax Fraction Hydrocracking Step)

As illustrated in FIG. 2, in the wax fraction hydrocracking step, the crude wax fraction that is supplied from the bottom of the first fractionator (not shown in the figure) through the line 14, and in some cases via an intermediate tank (not shown in the figure), is mixed with a bottom oil from the second fractionator 20 (described below) supplied through a line 24 and hydrogen gas, heated toward the reaction temperature by a heating means such as a heat exchanger, and subjected to hydrocracking in the wax fraction hydrocracking device 50, thus producing a hydrocracked product containing an uncracked wax. Unless stated otherwise, the hydrocracked product is deemed to include the uncracked wax. The hydrocracked product is subjected to gas-liquid separation in a first gas-liquid separator 55 and a second gas-liquid separator 57 described below, and the resulting liquid component is supplied to the second fractionator 20. The bottom oil from the second fractionator 20, which contains the uncracked wax as the main component, is returned through the line 24 to the line 14 that is upstream from the wax fraction hydrocracking device 50, is mixed with the crude wax fraction inside a mixing tank (not shown in the figure), and is once again supplied to the wax fraction hydrocracking device 50 and subjected to hydrocracking.

Although there are no particular limitations on the configuration of the wax fraction hydrocracking device 50 according to the present invention, a fixed-bed continuous-flow reactor is preferred. Either a single reactor may be used, or a plurality of reactors may be positioned in series or parallel. Further, the catalyst bed provided inside the reactor may be a single bed, or may be partitioned into a plurality of sections.

Examples of the hydrocracking catalyst used in the wax fraction hydrocracking device 50 include catalysts composed of a metal belonging to one of groups 8 to 10 of the periodic table as an active metal supported on a carrier containing a solid acid. Here, the term "periodic table" refers to the long period type periodic table of elements prescribed by IUPAC (the International Union of Pure and Applied Chemistry).

Examples of preferred carriers include carriers containing one or more solid acids selected from among crystalline zeolites such as ultra-stable Y-type (USY) zeolite, Y-type zeolite, mordenite and D-zeolite, and refractory amorphous composite metal oxides such as silica-alumina, silica-zirconia and alumina-boria. The carrier preferably contains one or more solid acids selected from among USY zeolite, silica-alumina, alumina-boria and silica-zirconia, and more preferably contains USY zeolite, alumina-boria and/or silica-alumina.

USY zeolite is an ultra stabilized zeolite prepared by subjecting a Y-type zeolite to a hydrothermal treatment and/or an acid treatment, and in addition to the so-called micropore structure with a pore size of 2 nm or less inherent to Y-zeolite, USY zeolite also includes new pores having a pore size within a range from 2 to 10 nm. The average particle size of the USY zeolite is not particularly limited, but is preferably not more than 1.0 μm, and more preferably 0.5 μm or less. Further, in the USY zeolite, the silica/alumina molar ratio (the molar ratio of silica relative to alumina) is preferably within a range from 10 to 200, more preferably from 15 to 100, and still more preferably from 20 to 60.

Furthermore, the carrier preferably contains 0.1 to 80% by mass of a crystalline zeolite and 0.1 to 60% by mass of a refractory amorphous composite metal oxide.

The carrier can be produced by molding a carrier composition containing the solid acid described above and a binder, and then calcining the composition. The blend proportion of the solid acid relative to the total mass of the carrier is preferably within a range from 1 to 70% by mass, and more preferably from 2 to 60% by mass. Furthermore, in those cases where the carrier includes USY zeolite, the blend proportion of the USY zeolite relative to the total mass of the carrier is preferably within a range from 0.1 to 10% by mass, and more preferably from 0.5 to 5% by mass. Moreover, in those cases where the carrier includes USY zeolite and alumina-boric, the blend ratio between the USY zeolite and the alumina-boria (USY zeolite/alumina-boria) is preferably a mass ratio of 0.03 to 1. Further, in those cases where the carrier includes USY zeolite and silica-alumina, the blend ratio between the USY zeolite and the silica-alumina (USY zeolite/silica-alumina) is preferably a mass ratio of 0.03 to 1.

Although there are no particular limitations on the binder, alumina, silica, titania or magnesia is preferred, and alumina is particularly desirable. The blend amount of the binder relative to the total mass of the carrier is preferably within a range from 20 to 98% by mass, and more preferably from 30 to 96% by mass.

There are no particular limitations on the shape of the molded carrier particles, and examples of suitable shapes include a spherical shape, cylindrical shape, and irregular cylindrical shapes having a three-leaf or four-leaf shaped cross-section. Further, although there are no particular limitations on the particle size of the molded carrier particles, from a practical perspective, the particle size is preferably within a range from 1 μm to 10 mm.

The calcining temperature for the carrier composition described above is preferably within a range from 400 to 550° C., more preferably from 470 to 530° C., and still more preferably from 490 to 530° C.

Specific examples of the metal belonging to one of groups 8 to 10 of the periodic table include cobalt, nickel, rhodium, palladium, iridium and platinum. Of these, the use of either a single metal or a combination of two or more metals selected from among nickel, palladium and platinum is preferred. These metals can be supported on the above-mentioned carrier using typical methods such as impregnation or ion exchange. Although there are no particular limitations on the amount of metal supported on the carrier, the total mass of the metal relative to the mass of the carrier is preferably within a range from 0.1 to 3.0% by mass.

The hydrogen partial pressure in the wax fraction hydrocracking device 50 is typically within a range from 0.5 to 12 MPa, and is preferably from 1.0 to 5.0 MPa.

The liquid hourly space velocity (LHSV) within the wax fraction hydrocracking device 50 is typically within a range from 0.1 to 10.0 h$^{-1}$, and is preferably from 0.3 to 3.5 h$^{-1}$. The ratio between the hydrogen gas and the wax fraction (hydrogen gas/oil ratio) is not particularly limited, but is typically within a range from 50 to 1,000 NL/L, and is preferably from 70 to 800 NL/L.

The reaction temperature during normal operation of the wax fraction hydrocracking device 50 (namely, the catalyst bed weighted average temperature) is typically within a range from 180 to 400° C., and is preferably from 200 to 370° C., more preferably from 250 to 350° C., and still more preferably from 280 to 350° C. If the reaction temperature exceeds 400° C., then the hydrocracking tends to proceed excessively, resulting in a reduction in the yield of the targeted middle distillate. Further, the hydrocracked product may become discolored, placing limits on its potential use as a base stock for fuels. In contrast, if the reaction temperature is lower than 180° C., then the hydrocracking of the wax fraction does not progress sufficiently, and the yield of the middle distillate tends to decrease. The reaction temperature is controlled by adjusting the temperature setting at the outlet of a heat exchanger 18 provided within the line 14.

During normal operation, the wax fraction hydrocracking device 50 is preferably operated so that the amount of those hydrocarbon components having a boiling point of not lower than 25° C. and not higher than 360° C. within the hydrocracked product is preferably within a range from 20 to 90% by mass, more preferably from 30 to 80% by mass, and still more preferably from 45 to 70% by mass, based on the total mass of the hydrocracked product having a boiling point of 25° C. or higher. Provided the amount of these specific hydrocarbon components satisfies the range mentioned above, the degree of progression of the hydrocracking is at an appropriate level, and the yield of the middle distillate can be increased.

(Gas-Liquid Separation Step)

In this example, the hydrocracked product from the wax fraction hydrocracking step is introduced into a two-stage gas-liquid separator and subjected to a gas-liquid separation. In other words, the hydrocracked product is separated into a gas component composed of unreacted hydrogen gas and gaseous hydrocarbons produced by excessive hydrocracking of the wax fraction, and a liquid component composed of liquid hydrocarbons.

A heat exchanger (not shown in the figure) for cooling the hydrocracked product is preferably installed within a line 52 connected to the outlet of the wax fraction hydrocracking device 50. Following cooling by this heat exchanger, the hydrocracked product is separated into a gas component and a liquid component by the first gas-liquid separator 55. The temperature inside the first gas-liquid separator 55 is preferably approximately 180 to 300° C. In other words, the liquid component separated within the first gas-liquid separator 55 is a heavy oil component composed of hydrocarbons that exist in a liquid state at the above temperature, and includes a large amount of the untracked wax. This heavy oil component is discharged from the bottom of the first gas-liquid separator 55, passes through the line 53 and the line 51, and is supplied to the second fractionator 20.

Meanwhile, the gas component separated within the first gas-liquid separator 55 is discharged from the top of the first gas-liquid separator 55, passes through a line 59, and is introduced into a heat exchanger (cooling device) 56, where the gas component is cooled and partially liquefied. The outflow from the heat exchanger 56 is supplied to the second gas-liquid separator 57. As a result of the cooling by the heat exchanger 56, the temperature at the inlet to the second gas-liquid separator 57 is approximately 90 to 130° C.

In the second gas-liquid separator 57, the gas component and the liquid component that has been condensed by the cooling by the heat exchanger 56 are separated. The separated gas component is discharged from the top of the second gas-liquid separator 57 through a line 19. A heat exchanger (not shown in the figure) is preferably provided within the line 19 to cool the gas component to approximately 40° C. This liquefies a portion of the light hydrocarbons within the gas component, which is then returned to the second gas-liquid separator 57. The remaining gas component is composed mainly of hydrogen gas containing gaseous hydrocarbons, and this gas component is supplied to the middle distillate hydrotreating device 40 or the naphtha fraction hydrotreating device 30 (not shown in the figure), and reused as hydrogen gas for the hydrotreating processes.

Meanwhile, the liquid component is discharged from a line 54 connected to the bottom of the second gas-liquid separator 57. This liquid component is a light oil component composed of lighter hydrocarbons that are liquid at the temperature within the second gas-liquid separator 57, which is of a lower temperature than the first gas-liquid separator 55. This light oil component is supplied through the line 51, together with the heavy oil component from the first gas-liquid separator 55, to the second fractionator 20.

By providing the two stages of gas-liquid separators in this manner, and employing the method described above wherein cooling is performed in two stages, it is possible to prevent problems such as blockages of the apparatus or the like, which is possibly caused when the components having a high freezing point (particularly the uncracked wax) contained within the hydrocracked product from the wax fraction hydrocracking step are solidified by cooling. In this example, the gas-liquid separation step was performed in two stages, but three or more stages may also be used.

(Fractional Distillation Step)

Subsequently, the liquid component that has been separated from the hydrocracked product from the wax fraction hydrocracking step by the gas-liquid separation step described above is supplied to the second fractionator 20 through the line 51. Further, the hydrotreated middle distillate discharged from the middle distillate hydrotreating device 40 is separated from a gas component containing mainly hydrogen gas in a gas-liquid separator 45, and then passes through the line 41 and is mixed with the above hydrocracked product before being supplied to the second fractionator 20. A middle distillate (kerosene and gas oil fraction) is obtained from the line 22 connected to the middle section of the second fractionator 20, a light fraction is obtained from the line 21 connected to the top of the second fractionator 20, and heavy hydrocarbons (a bottom oil) containing mainly the residual uncracked wax fraction retained within the hydrocracked product is recovered from the bottom of the fractionator.

(Recycling Step)

Subsequently, in the recycling step, all of the bottom oil obtained in the fractional distillation step is resupplied to the wax fraction hydrocracking device 50 through the line 24. This bottom oil contains the uncracked wax that is retained within the hydrocracked product from the wax fraction hydrocracking device 50, and therefore by resupplying the bottom oil to the wax fraction hydrocracking step, further hydrocracking is able to proceed, enabling the final yield of the middle distillate to be increased even further.

[Startup Method for Fractionator]

Next is a description of a first embodiment of a startup method for the second fractionator 20, with reference to FIG. 2.

(First Embodiment)

In the first embodiment, during startup of the second fractionator 20, a hydrocarbon oil that contains at least a portion of the hydrocracked product of the wax fraction and is liquid at a normal temperature and normal pressure is used for preheating the fractionator. Generally, said "at least a portion of the hydrocracked product" must also be liquid at a normal temperature and normal pressure so that the hydrocarbon oil is liquid at a normal temperature and normal pressure. The hydrocracked product may be the hydrocracked product that was produced by an operation conducted prior to the operations associated with the startup and has been stored, but is preferably supplied from an operating wax fraction hydrocracking device 50 that has been started immediately prior to the startup of the second fractionator 20. This means there is no necessity to provide a device for storing the hydrocracked product, meaning the equipment costs can be reduced. A detailed description of this first embodiment is presented below.

In the startup of the second fractionator 20, first, operation of the wax fraction hydrocracking device 50 is started, yielding an outflow oil, namely a hydrocracked product. Preheating of the fractionator and the lines and the like connected thereto is then performed using a hydrocarbon oil that contains at least a portion of the thus obtained hydrocracked product and is liquid at a normal temperature and normal pressure (the preheating step).

Here, the expression "a normal temperature and normal pressure" describes a temperature of 23° C. and an absolute pressure of 101,325 Pa (atmospheric pressure). Further, the expression "liquid at a normal temperature and normal pressure" means that the target hydrocarbon oil has a pour point, measured under atmospheric pressure in accordance with the method prescribed in JIS K2269, of 23° C. or lower.

A first aspect of the first embodiment of the startup method for a fractionator according to the present invention is described below.

Prior to startup of the second fractionator 20, operation of the wax fraction hydrocracking device 50 is started, and hydrocracking of the wax fraction is preferably performed so that the amount of hydrocarbon components having a boiling point of not lower than 25° C. and not higher than 360° C. within the hydrocracked product is at least 90% by mass based on the tot mass of the hydrocracked product having a boiling point of 25° C. or higher. Operating the wax fraction hydrocracking device 50 in this manner ensures that the hydrocracked product is liquid at a normal temperature and normal pressure.

In order to achieve an amount of hydrocarbon components having a boiling point of not lower than 25° C. and not higher than 360° C. within the hydrocracked product of at least 90% by mass based on the total mass of the hydrocracked product having a boiling point of 25° C. or higher, the reaction temperature of the wax fraction hydrocracking step is typically set to 300 to 400° C., preferably 320 to 380° C., and more preferably 320 to 350° C., and the LHSV is set to 0.1 to 1.2 $h^{-1}$, and preferably 0.2 to 1.0 $h^{-1}$. If the reaction temperature falls below 300° C., then the hydrocracking of the wax fraction and the isomerization of normal paraffins within the wax fraction tend to proceed poorly, and the resulting hydrocracked product tends not to be liquid at a normal temperature and normal pressure. On the other hand, if the reaction temperature exceeds 400° C., then there is a possibility that the cracked product may become discolored, making the hydrocracked product unusable as a product. Further, if the LHSV is less than 0.1 $h^{-1}$, then the flow rate of the hydrocracked product is slow, and achieving an efficient startup of the fractionator tends to be problematic. In contrast, if the LHSV exceeds 1.2 $h^{-1}$, then the hydrocracking of the wax fraction and the isomerization of normal paraffins within the wax fraction tend to proceed poorly, meaning the resulting hydrocracked product tends not to be liquid at a normal temperature and normal pressure.

Subsequently, the hydrocracked product discharged from the wax fraction hydrocracking device 50 is separated into a gas component and a liquid component, using multiple stages of gas-liquid separators in this particular example. The operating conditions for these gas-liquid separators are preferably the same as the normal operating conditions described above. The hydrocracked product is first subjected to a gas-liquid separation in the first gas-liquid separator 55. During normal operations outside of the startup period, the liquid component separated by the first gas-liquid separator 55 is usually a solid or semisolid at a normal temperature and normal pressure. However, during the startup of this embodiment, by selecting the hydrocracking conditions described above, the hydrocracking of the wax fraction and the hydroisomerization of the normal paraffins proceed sufficiently well that the liquid component separated by the first gas-liquid separator 55 is liquid at a normal temperature and normal pressure. Furthermore, the first gas-liquid separator 55 may yield essentially no liquid component, so that the entire hydrocracked product becomes a gas component.

The gas component separated by the first gas-liquid separator 55 is cooled by the heat exchanger 56, and the condensed liquid component is separated from the gas component in the second gas-liquid separator 57. The gas component is cooled to approximately 40° C. by a heat exchanger (a cooler, not shown in the figure) provided in the line 19, and the resulting liquefied light hydrocarbons are returned to the second gas-liquid separator 57.

In this first aspect of the first embodiment, a mixture of the liquid component (hydrocarbon oil) discharged from the first gas-liquid separator 55 and the liquid component (hydrocarbon oil) discharged from the second gas-liquid separator 57, namely the entire hydrocracked product discharged from the wax fraction hydrocracking device 50 excluding the gas component, may be used as the hydrocarbon oil used for preheating the second fractionator 20. In this case, the hydrocarbon oil from the first gas-liquid separator 55 and the hydrocarbon oil from the second gas-liquid separator 57 pass through the line 53 and the line 54 respectively, and merge together in the line 51.

The hydrocarbon oil discharged from the second gas-liquid separator 57 may also be used alone as the hydrocarbon oil for preheating the second fractionator 20, without using the hydrocarbon oil from the first gas-liquid separator 55. In this case, a valve (not shown in the figure) positioned within the line 53 is closed, and the liquid hydrocarbon oil obtained in the first gas-liquid separator 55 may be either stored inside the first gas-liquid separator 55, or recycled to the wax fraction hydrocracking device 50 through a line 58 and the line 24. By not using the hydrocarbon oil from the first gas-liquid separator 55, and using only the hydrocarbon oil discharged from the second gas-liquid separator 57 as the hydrocarbon oil for preheating the second fractionator 20, the pour point of the hydrocarbon oil can be lowered, and a liquid state can be maintained at a lower temperature. Accordingly, the hydrocarbon oil is particularly suitable in cases when the startup is performed in cold conditions.

The second fractionator 20 and the lines and the like connected thereto are preheated in the manner described below by the hydrocarbon oil for preheating the second fractionator 20 obtained in the manner described above.

The hydrocarbon oil for preheating passes through the line 51, is heated by a heat exchanger 28, and is then supplied to the second fractionator 20. The light fraction within the supplied hydrocarbon oil is discharged from the top of the second fractionator 20, passes through a heat exchanger 33 used for cooling, and the resulting liquefied hydrocarbons are stored in a reflux drum 34. The liquefied hydrocarbons in the reflux drum 34 are returned to the second fractionator 20 through a line 25.

On the other hand, a bottom oil is discharged from the bottom of the second fractionator 20, passes through lines 24, 27 and 51, and is then heated by the heat exchanger 28 and returned to the second fractionator 20. In this manner, by supplying the hydrocarbon oil through the line 51, refluxing the light fraction, and returning and heating the bottom oil from the bottom of the fractionator, the second fractionator 20 and the lines and the like connected thereto are preheated.

As the preheating of the second fractionator 20 and the lines and the like connected thereto proceeds in the manner described above, the temperatures of the second fractionator 20 and the lines and the like connected thereto increase. This preheating is continued at least until the temperature of the plate in the second fractionator 20 to which the feedstock oil is supplied (namely, the plate to which the hydrocarbon oil to preheat the second fractionator is supplied) reaches approximately 120° C. or higher. By ensuring that the temperature of the plate in the second fractionator 20 to which the feedstock oil is supplied is at least approximately 120° C., when the hydrocracked product containing the uncracked wax is subsequently supplied to the second fractionator 20, the problem that arises when the wax fraction solidifies in the lines in the vicinity of the inlet to the second fractionator 20 or inside the second fractionator 20, causing blockages within the apparatus, can be prevented. At this point, preheating of the second fractionator 20 is complete.

Once the preheating of the second fractionator 20 has been completed, supply of the hydrocracked product containing the uncracked wax to the second fractionator 20 is started. In other words, the operational procedures and operating conditions for the wax fraction hydrocracking step and the gas-liquid separation step are set to that of normal operation, and the entire liquid hydrocracked product is supplied to the second fractionator 20.

By starting and then continuing the supply of the hydrocracked product containing the uncracked wax to the second fractionator 20, the temperature profile of the second fractionator 20 approaches the temperature profile associated with normal operation. As one indicator, at the stage where the temperature of the plate in the second fractionator 20 to which the line 22 to extract the middle distillate is connected has increased to the temperature associated with normal operation, the operation of discharging the bottom oil, passing the bottom oil through the lines 24, 27 and 51, and then heating the bottom oil in the heat exchanger 28 before returning it to the second fractionator 20 is halted, and replaced with an operation in which the discharged bottom oil is fed through the line 24 and recycled to a position upstream from the wax fraction hydrocracking device 50. Further, discharge of the middle distillate from the line 22 is started. Moreover, discharge of the light fraction through the line 23 is also started. This completes the startup of the second fractionator 20.

Following completion of the startup of the second fractionator 20, supply of the outflow oil from the middle distillate hydrotreating device 40 to the second fractionator 20 can be started at any desired timing.

A second aspect of the first embodiment of the startup method for a fractionator according to the present invention is described below.

Prior to startup of the second fractionator 20, operation of the wax fraction hydrocracking device 50 is started, and the reaction temperature therein is set to a temperature similar to that adopted during normal operation. Further, although there are no particular limitations on the LHSV, the value is gradually increased toward the value associated with normal operation from the start of supply of the crude wax fraction usually. The hydrocracked product discharged from the wax fraction hydrocracking device 50 is introduced into the two stages of gas-liquid separators 55 to 57 described above, and subjected to gas-liquid separation. The operating conditions for the gas-liquid separators 55 and 57 are set to that of normal operation. The liquid component separated in the first gas-liquid separator 55 (180 to 300° C.) tends to contain a large amount of uncracked wax, particularly as the LHSV approaches the normal operating value, and tends to be a solid or semisolid with no fluidity at a normal temperature and normal pressure.

On the other hand, the gas fraction separated by the first gas-liquid separator 55 is cooled to approximately 90 to 130° C. by the heat exchanger (cooling device) 56, and the condensed liquid component is separated from the gas component in the second gas-liquid separator 57. The liquid component (hydrocarbon oil) obtained from this second gas-liquid separator 57 contains the comparatively light hydrocarbons left following the removal of the uncracked wax from the hydrocracked product in the first gas-liquid separator 55, and is a liquid at a normal temperature and normal pressure. In this aspect of the embodiment, a hydrocarbon oil containing only the liquid component obtained from the second gas-liquid separator 57 and not containing the liquid component obtained from the first gas-liquid separator 55 is used for conducting the preheating that accompanies startup of the second fractionator 20. In this case, during preheating of the second fractionator 20, a valve (not shown in the figure) installed in the line 53 is closed, and the liquid component obtained in the first gas-liquid separator 55 may be either stored inside the first gas-liquid separator 55, or recycled to the wax fraction hydrocracking device 50 through the line 58 and the line 24.

By employing the type of operation described above, a hydrocarbon oil that is liquid at a normal temperature and normal pressure is obtained from the second gas-liquid separator 57. Further, in this second aspect, because the operating temperature for the wax fraction hydrocracking device 50 is set to the normal operating temperature, and the LHSV is also increased towards the normal operating value, no special operating conditions need be set for the preheating that accompanies the startup of the second fractionator 20. Accordingly, when the preheating is completed, the operating conditions for the wax fraction hydrocracking device 50 are already that of normal operations, meaning normal operation can be started almost immediately.

In the second aspect of the first embodiment of the startup method for a fractionator according to the present invention, the operational method for supplying the obtained hydrocarbon oil to the second fractionator 20 and preheating the second fractionator 20 and the lines and the like connected thereto may be the same as the operational method described above for the first aspect of the above preferred embodiment, and the operational method following completion of the preheating of the second fractionator 20 until normal operation is started may also be the same as those described above for the first aspect of the above preferred embodiment.

The hydrocarbon oil used for the preheating that accompanies startup of the second fractionator 20 may not necessarily be composed of only the hydrocarbon oil that is liquid at a normal temperature and normal pressure obtained from the hydrocracked product of the wax fraction in the manner described above, and a mixed oil containing the above hydrocarbon oil and another hydrocarbon oil that is liquid at a normal temperature and normal pressure may also be used. An example of another preferred hydrocarbon oil that is liquid at a normal temperature and normal pressure is the outflow oil from the middle distillate hydrotreating device 40. In this case, prior to startup of the second fractionator 20, not only is operation of the wax fraction hydrocracking device 50 started, but operation of the middle distillate hydrotreating device 40 is also started, and the outflow oil therefrom is mixed with the hydrocarbon oil that is liquid at a normal temperature and normal pressure obtained from the hydrocracked product of the wax fraction, and the mixed oil is then used. In this case, the hydrocarbon oil that is liquid at a normal temperature and normal pressure obtained from the hydrocracked product of the wax fraction may be either a hydrocarbon oil obtained in accordance with the first aspect of the first embodiment, or a hydrocarbon oil obtained in accordance with the second aspect of the first embodiment.

As described above, even when startup of the second fractionator 20 is completed, the hydrocarbon oil used in preheating the second fractionator 20 is not necessary to be recovered and/or discarded, and can be simply used, without further modification, as a portion of the product. Accordingly, not only is there no need to procure the type of heating oil having specific properties required conventionally, but startup of the fractionator can also be performed very efficiently, enabling a reduction in the required costs.

A more detailed description of the present invention is presented below based on examples, but the present invention is in no way limited by the following examples.

EXAMPLE 1

Using an extrusion molding process, a mixture of a USY zeolite having an average particle size of 0.82 μm (silica/alumina molar ratio: 37), an alumina-boria (alumina/boria mass ratio: 5.6), and an alumina binder (USY zeolite/alumina-boria/alumina binder=4/56/40 (mass ratio)) was molded into particles having a cylindrical shape with a diameter of approximately 1.5 mm and a length of approximately 3 mm. The resulting molded product was dried and calcined to form a carrier. The carrier was then impregnated with an aqueous solution of chloroplatinic acid, thereby loading 0.6% by mass of platinum in terms of platinum atom based on the mass of the carrier. The carrier was then dried and calcined, yielding a hydrocracking catalyst.

Next, the thus obtained hydrocracking catalyst was packed inside a fixed-bed flow reactor, and using the type of apparatus illustrated in FIG. 2, the crude wax fraction (carbon numbers: 21 to 80, normal paraffins: 95% by mass) obtained by fractional distillation of the FT synthetic oil was subjected to hydrocracking.

First, the hydrocracking catalyst described above was subjected to a reduction treatment under a stream of hydrogen gas for 4 hours at 345° C. Subsequently, the crude wax fraction was supplied, and hydrocracking was performed under reaction conditions including a temperature of 330° C., a LHSV of 0.7 $h^{-1}$, a hydrogen gas partial pressure of 4.0 MPa, and a hydrogen/oil ratio of 674 NL/L.

The hydrocracked product discharged from the wax fraction hydrocracking device 50 was subjected to gas-liquid separation using the first gas-liquid separator 55 and the second gas-liquid separator 57. The temperature of the first gas-liquid separator 55 was set to 240° C. and the temperature of the second gas-liquid separator 57 was set to 90° C. The liquid component separated in the first gas-liquid separator 55 was fed through the line 53, the liquid component separated in the second gas-liquid separator 57 was fed through the line 54, and the two liquid components were merged together in the line 51, heated by the heat exchanger 28, and then supplied to the second fractionator 20. When the pour point of the hydrocarbon oil sampled from the line 51 was measured using the method prescribed in JIS K2269, the result was 20° C.

A hydrocarbon oil was discharged from the bottom of the second fractionator 20, passed through the lines 24, 27 and 51, heated by the heat exchanger 28, and then returned to the second fractionator 20. Further, a light component was discharged from the top of the second fractionator 20 through the line 21, Was liquefied by cooling in the heat exchanger 30, passed though the reflux drum 31, and was recirculated into the second fractionator 20.

Preheating of the second fractionator 20 and the lines and the like connected thereto was performed using the operations described above. The temperature of the plate in the second fractionator 20 to which the feedstock oil is supplied increased, and when the temperature reached 120° C., the preheating was stopped, the operating conditions for the wax fraction hydrocracking device 50 were adjusted to the normal operating conditions, namely, a temperature of 320° C., a LHSV of 2.0 $h^{-1}$, a hydrogen partial pressure of 4.0 MPa and a hydrogen/oil ratio of 674 NL/L, and the hydrocarbon oils obtained from the hydrocracked product containing the uncracked wax by passage through the gas-liquid separators 55 and 57 were mixed together in the line 51 and supplied to the second fractionator 20. Further, when the temperature of the plate to which the line 22 is connected to discharge the middle distillate had increased to a temperature of 295° C., the operation of recycling the bottom oil from the second fractionator 20 through the lines 24, 27 and 51 and the heat exchanger 28, and then back into the second fractionator 20 was stopped, and instead, an operation in which the same bottom oil was fed through the line 24 and recycled to a position (the line 14) upstream from the wax fraction hydrocracking device 50 was started. Further, discharge of the middle distillate from the line 22 was also started at the same time. Moreover, discharge of a light fraction through the line 23 was also started.

In this manner, startup of the second fractionator 20 was completed without any problems such as blockages caused by solidification of the uncracked wax.

Subsequently, supply of the outflow oil from the middle distillate hydrotreating device 40 to the second fractionator 20 was started, enabling a transition to normal operations.

EXAMPLE 2

Startup of the second fractionator 20 was performed using the same operations as those described for example 1, with the exceptions of setting the reaction temperature of the wax fraction hydrocracking device 50 to 320° C., gradually increasing the LHSV from $0.7\ h^{-1}$ towards $2.0\ h^{-1}$, closing the valve (not shown in the figure) positioned within the line 53, recycling the liquid component obtained from the first gas-liquid separator 55 through the line 58 and the line 24 and back into the wax fraction hydrocracking device 50, and supplying only the liquid component obtained from the second gas-liquid separator 57 to the second fractionator 20, via the lines 54 and 51 and the heat exchanger 28. Collection and measurement of the pour point of the hydrocarbon oil obtained from the second gas-liquid separator 57 revealed a value of −17.5° C.

The startup of the second fractionator 20 was completed without any problems such as blockages caused by solidification of the uncracked wax.

As described above, by preheating the second fractionator 20 and the lines and the like connected thereto using a hydrocarbon oil that contains at least a portion of the hydrocracked product of the wax fraction and is liquid at a normal temperature and normal pressure, startup of the fractionator was able to be conducted without any blockages of the apparatus caused by solidification of the untracked wax.

Next is a description of a second embodiment of the startup method for the second fractionator 20, with reference to FIG. 2.

(Second Embodiment)

During startup of the second fractionator 20, first, operation of the middle distillate hydrotreating device 40 is started. Specifically, the crude middle distillate supplied from the middle section of a first fractionator (not shown in the figure) is supplied through the line 13 to the middle distillate hydrotreating device 40, and hydrotreating is performed. The operating conditions may be the same as the above-mentioned normal operating conditions for the device. However, at the start of operations for this step, the supply of the crude middle distillate is started at a small supply rate (LHSV), and this supply rate is gradually increased, in a similar manner to the start of operations for any typical device.

The hydrotreated product discharged from the middle distillate hydrotreating device 40 is subjected to gas-liquid separation in the gas-liquid separator 45. The gas component separated by this separator contains unreacted hydrogen gas as the main component. On the other hand, the obtained liquid component (hydrotreated product) is a hydrocarbon oil in which olefins and oxygen-containing compounds have been converted to paraffinic hydrocarbons by the hydrotreating, and in which at least a portion of the normal paraffins that represent the major component of the crude middle distillate have been converted to isoparaffins by hydroisomerization. This hydrotreated product is liquid at a normal temperature and normal pressure, is composed of paraffinic hydrocarbons containing essentially no sulfur components, aromatic hydrocarbons or naphthenic hydrocarbons, and is a hydrocarbon oil that is ideal for preheating the second fractionator 20.

The second fractionator 20 and the lines and the like connected thereto are preheated by this type of hydrotreated product in the manner described below (the preheating step).

The hydrotreated product obtained in the manner described above passes through the line 41, is heated by the heat exchanger 28, and is then supplied to the second fractionator 20. The light fraction within the supplied hydrotreated product is discharged from the top of the second fractionator 20, passes through the heat exchanger 30 used for cooling, and the resulting liquefied hydrocarbons are stored in the reflux drum 31. The liquefied hydrocarbons in the reflux drum 31 are returned to the second fractionator 20 through the line 25.

On the other hand, a bottom oil is discharged from the bottom of the second fractionator 20, passes through lines 24, 27 and 51, and is then heated by the heat exchanger 28 and returned to the second fractionator 20. In this manner, the second fractionator 20 and the lines and the like connected thereto are preheated using the above-mentioned hydrotreated product.

As the preheating of the second fractionator 20 and the lines and the like connected thereto proceeds in the manner described above, the temperatures of the second fractionator 20 and the lines and the like connected thereto increase. This preheating is continued at least until the temperature of the plate in the second fractionator 20 to which the feedstock oil is supplied (namely, the plate to which the hydrotreated product is supplied) reaches approximately 120° C. or higher. By ensuring that the temperature of the plate in the second fractionator 20 to which the feedstock oil is supplied is at least approximately 120° C., when the hydrocracked product containing the uncracked wax is subsequently supplied to the second fractionator 20, the problem that arises when the wax fraction solidifies in the lines in the vicinity of the inlet to the second fractionator 20 or inside the second fractionator 20, causing blockages within the apparatus, can be prevented. At this point, preheating of the second fractionator 20 is complete.

Once the preheating of the second fractionator 20 has been completed, operation of the wax fraction hydrocracking device 50 is started, and supply of the hydrocracked product containing the uncracked wax to the second fractionator 20 is started. Specifically, the crude wax fraction supplied from the bottom of the first fractionator (not shown in the figure) is supplied to the wax fraction hydrocracking device 50, and hydrocracking is performed. The operating conditions for the wax fraction hydrocracking device 50 are preferably the above-mentioned normal operating conditions for the device, but in a similar manner as that described above for the start of operations for the middle distillate hydrotreating step, the supply of the crude wax fraction is started at a small supply rate (LHSV), and this supply rate is gradually increased. The discharged hydrocracked product containing the uncracked wax undergoes gas-liquid separation in the two stages of gas-liquid separators provided in this example, namely the first gas-liquid separator 55 and the second gas-liquid separator 57, the resulting liquid component is merged with the hydrotreated product flowing through the line 41, and the merged liquid is heated by the heat exchanger 28 and supplied to the second fractionator 20.

By starting and then continuing the supply of the hydrocracked product containing the uncracked wax to the second fractionator 20, the temperature profile of the second fractionator 20 approaches the temperature profile associated with normal operation. As one indicator, at the stage where the temperature of the middle distillate extraction plate in the second fractionator 20 to which the line 22 is connected, has increased to the temperature associated with normal operation, the operations of recycling the bottom oil to a position upstream from the wax fraction hydrocracking device 50 and discharging the middle distillate from the line 22 are started.

Further, discharge of the naphtha fraction is also started. This completes the startup of the second fractionator 20.

As described above, the hydrotreated product used in preheating the second fractionator 20 is not necessary to be recovered and/or discarded, and is simply used, without further modification, as a portion of the product.

According to the process described above, there is no need to prepare the type of heating oil having specific properties required conventionally, the hydrotreated product that is used does not require disposal by discarding or combustion, but can simply be used as a portion of the normal products, and the startup of the fractionator can be performed efficiently. Accordingly, the costs associated with the startup of the fractionator can be reduced.

The startup method for a fractionator according to the present invention is not limited to the first embodiment and second embodiment described above, and various modifications can be made without departing from the scope and gist of the present invention.

For example, in the example of FT synthetic oil upgrading systems described above in which the first embodiment and second embodiment are performed, the mixture of the hydrocracked product of the wax fraction discharged from the wax fraction hydrocracking device 50 and the hydrotreated product of the middle distillate discharged from the middle distillate hydrotreating device 40 is supplied to the second fractionator and fractionally distilled. On the other hand, the second fractionator may fractionally distill the hydrocracked product of the wax fraction only, providing another fractionator to fractionally distill the hydrotreated middle distillate downstream from the middle distillate hydrotreating device 40 separately from the second fractionator 20.

INDUSTRIAL APPLICABILITY

According to the startup method of the present invention, a fractionator can be preheated without using a dedicated heating oil having special properties, and the hydrocarbon oil used for the preheating (either a hydrocarbon oil that contains at least a portion of the hydrocracked product of a wax fraction contained within an FT synthetic oil and is liquid at a normal temperature and normal pressure, or a hydrotreated product of a middle distillate contained within an FT synthetic oil) can be used as a product, rather than becoming a waste oil or a fuel for internal use within the facility, meaning the fractionator can be started up efficiently.

DESCRIPTION OF THE REFERENCE SIGNS

10: First fractionator
20: Second fractionator
40: Middle distillate hydrotreating device
50: Wax fraction hydrocracking device
55: First gas-liquid separator
57: Second gas-liquid separator

The invention claimed is:

1. A startup method for a fractionator that is supplied with, and fractionally distills, a hydrocracked product obtained in a wax fraction hydrocracking step by hydrocracking a wax fraction contained within a Fischer-Tropsch synthetic oil, the method comprising:
  a preheating step of preheating the fractionator using a hydrocarbon oil that comprises at least a portion of the hydrocracked product and is liquid at a normal temperature and normal pressure,
  wherein the preheating step comprises:
  a step of heating the hydrocarbon oil and supplying the hydrocarbon oil to the fractionator,
  a step of discharging a bottom oil from a bottom of the fractonator, heating the bottom oil, and returning the heated bottom oil to the fractionator, and
  a step of refluxing a fraction that is distilled from a top of the fractionator into the fractionator.

2. The startup method for a fractionator according to claim 1, wherein the hydrocracked product is supplied from an operating wax fraction hydrocracking step.

3. The startup method for a fractionator according to claim 1, wherein the hydrocracked product is obtained by hydrocracking the wax fraction under conditions including a temperature of 300 to 400° C. and a LHSV rate of 0.1 to 1.2 h$^{-1}$.

4. The startup method for a fractionator according to claim 1, wherein the at least a portion of the hydrocracked product is obtained by cooling and liquefying a gas component obtained by performing a gas-liquid separation of the hydrocracked product at a temperature of 180 to 300° C.

5. The startup method for a fractionator according to claim 1, wherein the hydrocarbon oil is a mixture of at least a portion of the hydrocracked product and a hydrotreated product obtained by hydrotreating a middle distillate contained within the Fischer-Tropsch synthetic oil.

6. A startup method for a fractionator that is supplied with, and fractionally distills, a hydrocracked product obtained by hydrocracking a wax fraction contained within a Fischer-Tropsch synthetic oil, the method comprising:
  a preheating step of preheating the fractionator using a hydrotreated product supplied from the middle distillate hydrotreating step hydrotreating a middle distillate contained within the synthetic oil,
  wherein the preheating step comprises
  a step heating the hydrotreated product and supplying the hydrotreated product to the fractionator,
  a step of discharging a bottom oil from the bottom of the fractionator, heating the bottom oil, and returning the heated bottom oil to the fractionator, and
  a step of refluxing a fraction that is distilled from a top of the fractionator into the fractionator.

* * * * *